United States Patent
Mackay et al.

(10) Patent No.: US 10,635,619 B2
(45) Date of Patent: Apr. 28, 2020

(54) ENCODING FOR MULTI-DEVICE SYNCHRONIZATION OF DEVICES

(71) Applicant: Cirrus Logic International Semiconductor Ltd., Edinburgh (GB)

(72) Inventors: Graeme Gordon Mackay, Austin, TX (US); Jeffrey Allen May, Dripping Springs, TX (US); Jieren Bian, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 563 days.

(21) Appl. No.: 15/291,670

(22) Filed: Oct. 12, 2016

(65) Prior Publication Data

US 2018/0101495 A1 Apr. 12, 2018

(51) Int. Cl.
*G06F 13/38* (2006.01)
*H04L 12/413* (2006.01)
(Continued)

(52) U.S. Cl.
CPC .......... *G06F 13/387* (2013.01); *G06F 1/3287* (2013.01); *G06F 1/3296* (2013.01); *G06F 13/124* (2013.01); *G06F 13/405* (2013.01); *G06F 13/4295* (2013.01); *H04L 12/40143* (2013.01); *H04L 12/4135* (2013.01)

(58) Field of Classification Search
CPC ............................ G06F 13/387; H04L 13/4135
See application file for complete search history.

(56) References Cited

U.S. PATENT DOCUMENTS

| 5,404,538 A | 4/1995 | Krappweis, Sr. |
| 5,414,386 A | 5/1995 | Adachi et al. |

(Continued)

FOREIGN PATENT DOCUMENTS

| EP | 0486072 A2 | 5/1992 |
| EP | 0978964 A2 | 2/2000 |

(Continued)

OTHER PUBLICATIONS

Combined Search and Examination Report under Sections 17 and 18(3), UKIPO, Application No. GB1702539.6, dated Jul. 31, 2017.
(Continued)

*Primary Examiner* — Zachary K Huson
(74) *Attorney, Agent, or Firm* — Jackson Walker L.L.P.

(57) ABSTRACT

A distributed network system may include a shared communication bus that operates in accordance with a communication protocol and a plurality of devices coupled to the bus. In accordance with the communication protocol, when one or more of the plurality of devices is actively transmitting data on the bus, each of the plurality of devices receives data via the bus such that bidirectional communication is established among the plurality of devices via the bus, each of the plurality of devices monitors a bus state of the shared communication bus to avoid data contention and to synchronize receipt of encoded symbols and encoded messages comprising encoded symbols via the bus, and each actively transmitting device of the plurality of devices compares the bus state to a desired state of such actively transmitting device to determine a priority among actively transmitting devices of the plurality of devices with respect to the bus.

32 Claims, 4 Drawing Sheets

FIG. 6

(51) Int. Cl.
    *H04L 12/40*     (2006.01)
    *G06F 1/3287*     (2019.01)
    *G06F 1/3296*     (2019.01)
    *G06F 13/12*     (2006.01)
    *G06F 13/40*     (2006.01)
    *G06F 13/42*     (2006.01)

(56) References Cited

U.S. PATENT DOCUMENTS

| | | | |
|---|---|---|---|
| 5,968,154 | A | 10/1999 | Cho |
| 6,836,714 | B1 | 12/2004 | Nitschke et al. |
| 9,479,275 | B2 * | 10/2016 | Poulsen .................... H04J 3/02 |
| 2004/0193934 | A1 | 9/2004 | Kahn |
| 2008/0101420 | A1 | 5/2008 | Nichols |
| 2012/0314738 | A1 | 12/2012 | Kashima et al. |

FOREIGN PATENT DOCUMENTS

| | | |
|---|---|---|
| EP | 1145100 A2 | 10/2001 |
| WO | 0230021 A2 | 4/2002 |

OTHER PUBLICATIONS

International Search Report and Written Opinion of the International Searching Authority, International Patent Application No. PCT/US2017/052484, dated Feb. 15, 2018.

Anonymous: "CAN bus—Wikipedia", Oct. 6, 2016, Retrieved from the Internet: URL:https://en.wikipedia.org/w/index.php?title+CAN_bus&oldid=742869348 [retrieved on Oct. 25, 2017.

Ahmed, S. I. et al.: "Overview of oversampling clock and data recovery circuits", Canadian Conference on Electrical and Computer Engineering, May 1-4, 2005, Piscataway, NJ, USA, IEEE Piscataway, NJ, May 1, 2005, pp. 1876-1881.

* cited by examiner

FIG. 9
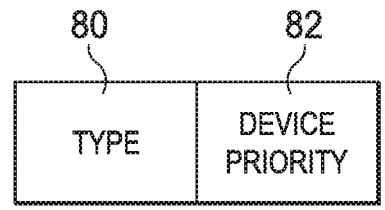
FIG. 10A
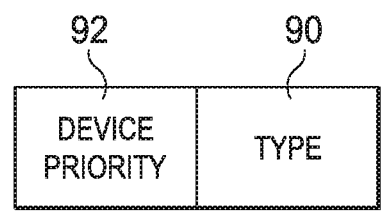
FIG. 10B

ENCODING FOR MULTI-DEVICE SYNCHRONIZATION OF DEVICES

FIELD OF DISCLOSURE

The present disclosure relates in general to circuits for audio systems, including without limitation personal audio devices such as wireless telephones and media players, and more specifically, to control, response, and/or state machine synchronization of distributed networks of audio devices within an audio system.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers.

Within both consumer and professional audio equipment, it is often necessary that an operational response among different audio channels is matched. For example, a requirement of such audio systems is that data path group delays and acoustic responses to events (e.g., an interrupt, device error, etc.) be matched across all audio channels, and that at a minimum, such responses be controlled and deterministic.

However, oftentimes in such devices, multiple amplifiers and multiple data paths may be used to drive a plurality of speakers. Most commonly, placement of such amplifiers may be localized to the speakers themselves, meaning that amplifiers may not be in proximity to one another and an amplifier may be subject to local error events not observed by one or more other amplifiers. As an example, a battery connection to a main printed circuit board housing the amplifiers may not be symmetric to the amplifiers, meaning that there may be more series parasitic losses between one amplifier and the battery supply than with another amplifier and the battery supply. If an equivalent amount of power from the battery is consumed by each amplifier, the local supply voltage at one amplifier may be lower than at another amplifier. Such inequality in power consumption may produce a condition whereby one amplifier has to respond to a low voltage error condition, but another amplifier may not observe the error condition.

Often in portable battery powered devices, an amplifier's response to such a low voltage condition may be to reduce the volume of the amplifier, thereby reducing the current consumption of the amplifier in order to preserve the battery's supply voltage for the rest of the system. However, if this audio attenuation is performed on one channel but not another channel, it may have undesirable acoustical effects which create a negative experience to the end user. To illustrate, human hearing is very often sensitive to changes in audio. This sensitivity allows humans to discern things, like direction of the source, approximate distance to the source, whether sound has bounced off an object, and identifying various abnormalities and changes in an expected sound. Both ears are typically leveraged as a part of this process, bringing into the stereo nature of sound. The process of hearing effectively thus creates an "image" of the sound.

For media playback, an audio signal is often intentionally manipulated in order to take advantage of how sound is interpreted by the brain. This intentional audio manipulation is especially true for multi-channel sound. For multi-channel sound, in order for this intentional audio manipulation to be effective and reproducible, certain system-level parameters need to be known and remain constant or deterministic. As electronic audio components become more miniaturized, they also tend to become more distributed in the end system. However, with this distributed architecture, the deterministic requirements, such as channel-to-channel phase and amplitude, have not changed, and thus, an additional approach is needed to ensure the key deterministic relationships of an audio system, such as the multi-device synchronization for audio devices.

Utilizing a software approach, such as an interrupt-based scheme along with control port writes, to mitigate response differences between amplifiers has limitations. Such approach requires a control port master device to: (1) monitor for interrupts, (2) be able to distinguish between different error conditions, possibly requiring control port reads, (3) determine a response to the error condition, and (4) then exchange the information with the other amplifier(s). With conditions continually changing, this approach can be burdensome on the developer and software resources, and still may not have an appropriate response time to properly handle the error condition.

Other unmatched behavior, such as indeterminate group delays (or inter-channel phase shifts), can also produce undesirable acoustic effects. In a controlled manner, manipulating signal phase along with amplitude and frequency shifting can be used to create acoustic effects, such as sound localization, mimicking reverberation, virtual surround sound, etc. However, when a system does not have sufficient control over the systematic behavior of a distributed network of devices, the hardware system can both interact with the multi-channel acoustic performance of the system and create undesirable acoustic effects of its own.

The controlled matching of group delays or system level responses is not just important for purposes of controlling audio output, but is also important for monitoring systems where the signal timing between devices is a key part of the desired functionality. For example, in ultrasonic applications, such as proximity detection or gesture identification, where timing of the signal is critical, a distributed network of analog-to-digital converters connected to ultrasonic microphones would need to be synchronized. Without this synchronization, the detection algorithms might not be able to acquire enough valid data to respond properly.

SUMMARY

In accordance with the teachings of the present disclosure, one or more disadvantages and problems associated with existing approaches to synchronizing functionality among a distributed network of devices may be reduced or eliminated.

In accordance with embodiments of the present disclosure, a distributed network system may include a shared communication bus that operates in accordance with a communication protocol and a plurality of devices coupled to the shared communication bus. In accordance with the communication protocol, when one or more of the plurality of devices is actively transmitting data on the shared communication bus, each of the plurality of devices receives data via the shared communication bus such that bidirectional communication is established among the plurality of devices via the shared communication bus, each of the plurality of devices monitors a bus state of the shared communication bus to avoid data contention and to synchronize receipt of encoded symbols and encoded messages comprising encoded symbols via the shared communication bus, and each actively transmitting device of the plurality of devices compares the bus state to a desired state of such actively transmitting device to determine a priority among actively transmitting devices of the plurality of devices with respect to the shared communication bus.

In accordance with these and other embodiments of the present disclosure, a distributed network system may include a shared communication bus that operates in accordance with a communication protocol and a plurality of devices coupled to the shared communication bus. In accordance with the communication protocol, in response to receipt of an encoded message via the shared communication bus, each of the plurality of devices transmits to the shared communication bus an encoded payload comprising a plurality of encoded symbols indicative of a variable associated with the encoded message, and at least one device of the plurality of devices monitors the shared communication bus to determine a maximum value of the variable.

In accordance with these and other embodiments of the present disclosure, a distributed network system may include a shared communication bus that operates in accordance with a communication protocol and a plurality of devices coupled to the shared communication bus, wherein, in accordance with the communication protocol, encoded messages transmitted by the plurality of devices to the shared communication bus each comprises a data structure comprising a plurality of encoded symbols to enable the plurality of devices to share bandwidth for transmitting encoded messages on the shared communication bus.

In accordance with these and other embodiments of the present disclosure, a distributed network system may include a shared communication bus that operates in accordance with a communication protocol and a plurality of devices coupled to the shared communication bus, wherein each of the devices is configured to wake the shared communication bus from an idle state by causing an electrical transition of a voltage of the shared communication bus.

In accordance with these and other embodiments of the present disclosure, a distributed network system may include a shared communication bus that operates in accordance with a communication protocol and a plurality of devices coupled to the shared communication bus, wherein each of the devices is configured to wake the shared communication bus from an idle state by transmitting an encoded synchronization symbol on the shared communication bus such that other devices on the shared communication bus synchronize respective synchronization clocks internal to the other devices based on detection of an electrical transition of a voltage of the shared communication bus associated with the encoded synchronization symbol.

In accordance with these and other embodiments of the present disclosure, a method may include operating a plurality of devices of a distributed network system in accordance with a communication protocol for a shared communication bus to which the plurality of devices are each coupled such that in accordance with the communication protocol: (i) when one or more of the plurality of devices is actively transmitting data on the shared communication bus, each of the plurality of devices receives data via the shared communication bus such that bidirectional communication is established among the plurality of devices via the shared communication bus; (ii) each of the plurality of devices monitors a bus state of the shared communication bus to avoid data contention and to synchronize receipt of encoded symbols and encoded messages comprising encoded symbols via the shared communication bus; and (iii) each actively transmitting device of the plurality of devices compares the bus state to a desired state of such actively transmitting device to determine a priority among actively transmitting devices of the plurality of devices with respect to the shared communication bus.

In accordance with these and other embodiments of the present disclosure, a method may include operating a plurality of devices of a distributed network system in accordance with a communication protocol for a shared communication bus to which the plurality of devices are each coupled such that in accordance with the communication protocol, in response to receipt of an encoded message via the shared communication bus: (i) each of the plurality of devices transmits to the shared communication bus an encoded payload comprising a plurality of encoded symbols indicative of a variable associated with the encoded message and (ii) at least one device of the plurality of devices monitors the shared communication bus to determine a maximum value of the variable.

In accordance with these and other embodiments of the present disclosure, a method may include operating a plurality of devices of a distributed network system in accordance with a communication protocol for a shared communication bus to which the plurality of devices are each coupled such that in accordance with the communication protocol, encoded messages transmitted by the plurality of devices to the shared communication bus each comprises a data structure comprising a plurality of encoded symbols to enable the plurality of devices to share bandwidth for transmitting encoded messages on the shared communication bus.

In accordance with these and other embodiments of the present disclosure, a method may include operating a plurality of devices of a distributed network system in accordance with a communication protocol for a shared communication bus to which the plurality of devices are each coupled such that in accordance with the communication protocol, each of the devices is configured to wake the shared communication bus from an idle state by causing an electrical transition of a voltage of the shared communication bus.

In accordance with these and other embodiments of the present disclosure, a method may include operating a plurality of devices of a distributed network system in accordance with a communication protocol for a shared communication bus to which the plurality of devices are each coupled such that in accordance with the communication protocol, each of the devices is configured to wake the shared communication bus from an idle state by transmitting an encoded synchronization symbol on the shared communication bus such that other devices on the shared communication bus synchronize respective synchronization clocks internal to the other devices based on detection of an electrical transition of a voltage of the shared communication bus associated with the encoded synchronization symbol.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 9 illustrates a timing diagram illustrating an example hypothetical situation in which four devices attempt to communicate encoded payloads in response to a message received by each of the devices, in accordance with embodiments of the present disclosure; and FIGS. 10A and 10B each shows example message formats employing device priority fields, in accordance with embodiments of the present disclosure.

DETAILED DESCRIPTION

The multi-device synchronization approach disclosed herein may allow multiple, distributed devices in a network of devices to be aware of the operational state and configuration of each other, effectively performing as a single device on the system, while remaining low impact and low complexity to the system comprising the distributed devices. The multi-device synchronization may remain captive to the devices which are to have their operations synchronized.

Figure 1:
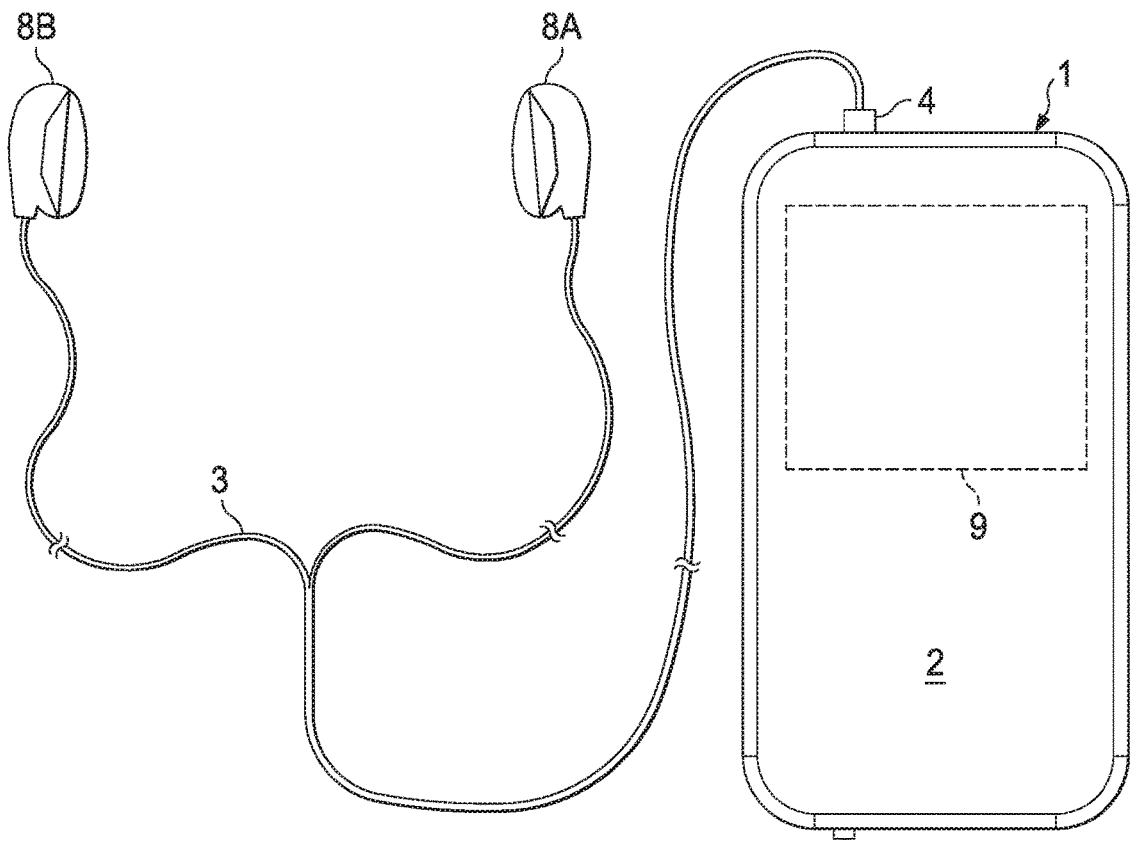
FIG. 1 illustrates an example personal audio device, in accordance with embodiments of the present disclosure.

FIG. 1 illustrates an example personal audio device 1, in accordance with embodiments of the present disclosure. FIG. 1 depicts personal audio device 1 coupled to a headset 3 in the form of a pair of earbud speakers 8A and 8B. Headset 3 depicted in FIG. 1 is merely an example, and it is understood that personal audio device 1 may be used in connection with a variety of audio transducers, including without limitation, headphones, earbuds, in-ear earphones, and external speakers. A plug 4 may provide for connection of headset 3 to an electrical terminal of personal audio device 1. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 1, personal audio device 1 may include an audio integrated circuit (IC) 9 for generating an analog audio signal for transmission to headset 3 and/or another audio transducer.

Figure 2:
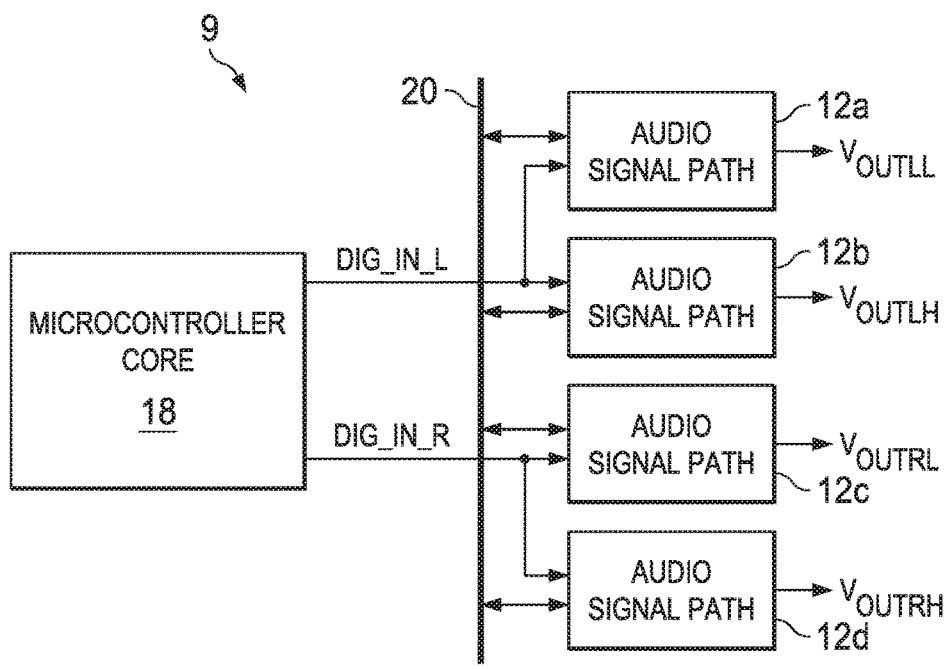
FIG. 2 illustrates a block diagram of selected components of an example audio integrated circuit of a personal audio device, in accordance with embodiments of the present disclosure.

FIG. 2 illustrates a block diagram of selected components of an example audio integrated circuit 9 of a personal audio device, in accordance with embodiments of the present disclosure. As shown in FIG. 2, a microcontroller core 18 may supply digital audio input signals DIG_IN_L and DIG_IN_R to multiple audio signal paths 12 (e.g., audio signal paths 12a, 12b, 12c, and 12d), each of which may generate its own analog output signal (e.g., $V_{OUTLL}$, $V_{OUTLH}$, $V_{OUTRL}$, and $V_{OUTRH}$) to drive a transducer, such as an audio speaker or headphone. For example, analog output signal $V_{OUTLL}$ may drive a left-side low-frequency speaker (e.g., woofer), analog output signal $V_{OUTLH}$ may drive a left-side high-frequency speaker (e.g., tweeter), analog output signal $V_{OUTRL}$ may drive a right-side low-frequency speaker (e.g., woofer), and analog output signal $V_{OUTRH}$ may drive a right-side high-frequency speaker (e.g., tweeter). Also as shown in FIG. 2, and as described in greater detail below, components of audio signal paths 12a, 12b, 12c, and 12d may be communicatively coupled to a shared communication bus 20 for communicating control and/or state information among such components.

Figure 3:
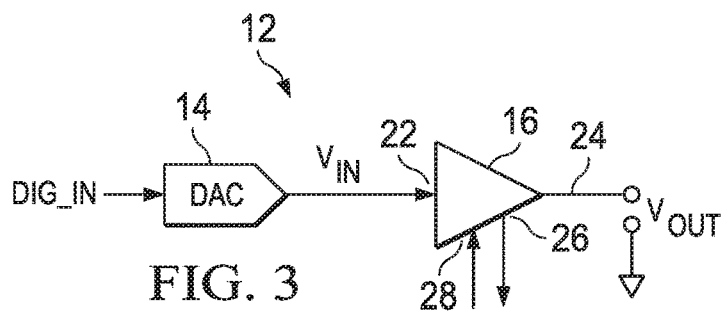
FIG. 3 illustrates a block diagram of selected components of an example audio signal path of an audio integrated circuit of a personal audio device, in accordance with embodiments of the present disclosure.

FIG. 3 illustrates a block diagram of selected components of an example audio signal path 12 of an audio integrated circuit 9 of a personal audio device 1, in accordance with embodiments of the present disclosure. Audio signal path 12 may be used to implement audio signal paths 12a, 12b, 12c, and/or 12d depicted in FIG. 2. As shown in FIG. 3, a digital-to-analog converter (DAC) 14 may receive a digital audio input signal DIG_IN (e.g., DIG_IN_L or DIG_IN_R) and convert the digital audio input signal to an analog signal $V_{IN}$. DAC 14 may supply analog signal $V_{IN}$ to an amplifier 16 which may receive analog signal $V_{IN}$ at an input 22 of amplifier 16 and may amplify or attenuate audio input signal $V_{IN}$ to provide an audio output signal $V_{OUT}$ (e.g., $V_{OUTLL}$, $V_{OUTLH}$, $V_{OUTRL}$, and $V_{OUTRH}$) at output 24 of amplifier 16, which may operate a speaker, a headphone transducer, a line level signal output, and/or other suitable output. In some embodiments, DAC 14 may be an integral component of amplifier 16. As shown in FIG. 2, amplifier 16 may also include a transmitter 26 for actively transmitting data in accordance with a communication protocol on a shared communication bus (e.g., shared communication bus 20) configured to couple to amplifier 16 and a plurality of other devices (e.g., amplifiers for other audio channels) coupled to the shared communication bus, and a receiver 28 for receiving data via the shared communication bus from at least one of the other devices coupled to the shared communication bus. In some embodiments, transmitter 26 and receiver 28 may be combined into a single functional unit such that only a single pin of amplifier 16 may be coupled to communication bus 20.

Although FIGS. 2 and 3 contemplate that audio IC 9 resides in a personal audio device, systems and methods described herein may also be applied to electrical and electronic systems and devices other than a personal audio device, including audio systems for use in a computing device larger than a personal audio device, an automobile, a building, or other structure.

Figure 4:
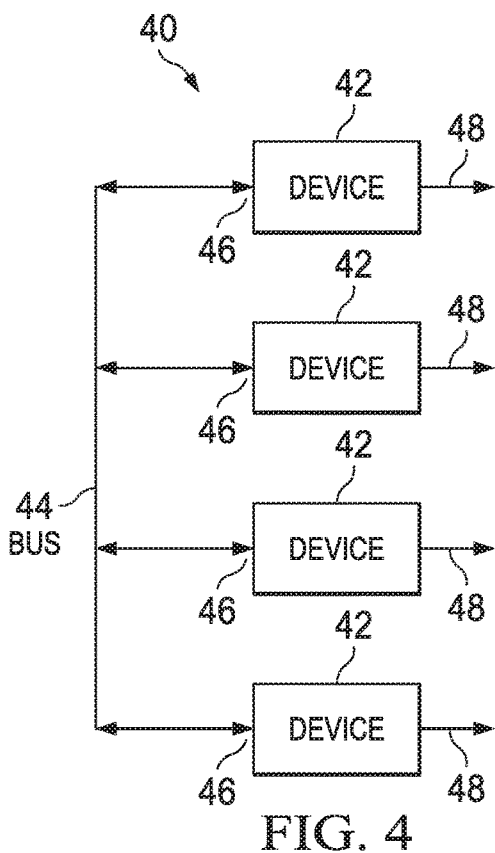
FIG. 4 illustrates a block diagram of selected components of a distributed network of devices coupled to one another via a communication bus, in accordance with embodiments of the present disclosure.

FIG. 4 illustrates a block diagram of selected components of a distributed network 40 of devices 42 coupled together via a communication bus 44 (e.g., which may implement communication bus 20 depicted in FIG. 2), in accordance with embodiments of the present disclosure. In some embodiments, devices 42 may comprise amplifiers 16 of multiple audio signal paths 12, as shown in FIGS. 2 and 3. In other embodiments, devices 42 may comprise other components of an audio signal path, such as a coder-decoder, a DAC, an analog-to-digital converter (ADC), or a sensor (e.g., a microphone or sound pressure sensor). In yet other embodiments, devices 42 may be a component of a system other than an audio system, such as an ultrasonic system (e.g., for proximity detection) wherein each device 42 outputs or drives an ultrasonic signal or a haptic system in which each device 42 outputs or drives a haptic signal. In these and other embodiments, all devices 42 of distributed network 40 may be homogeneous (e.g., all devices 42 may comprise audio amplifiers, all devices 42 may comprise coder-decoders, all devices 42 may comprise DACs, all devices 42 may comprise ADCs, all devices may comprise sensors, etc.). Accordingly, each device 42 may have an output 48 for driving an appropriate output signal (e.g., audio, ultrasonic, or haptic signal).

As shown in FIG. 4, devices 42 may include pins 46 for bidirectionally communicating with shared communication bus 44. Shared communication bus 44 may comprise any suitable communication bus. In some embodiments, shared communication bus 44 may comprise a single electrical wire or node.

Although FIG. 4 depicts distributed network 40 having four devices 42, other embodiments consistent with this disclosure may include any number of devices 42.

Figure 5:
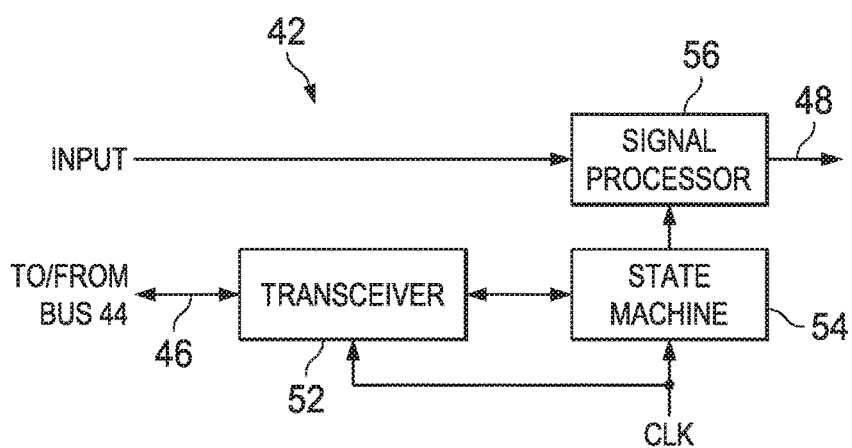
FIG. 5 illustrates a block diagram of selected components of a device, in accordance with embodiments of the present disclosure.

FIG. 5 illustrates a block diagram of selected components of a device 42, in accordance with embodiments of the present disclosure. As shown in FIG. 5, a device 42 may include a transceiver 52, a state machine 54, and a signal processor 56.

Figure 6:
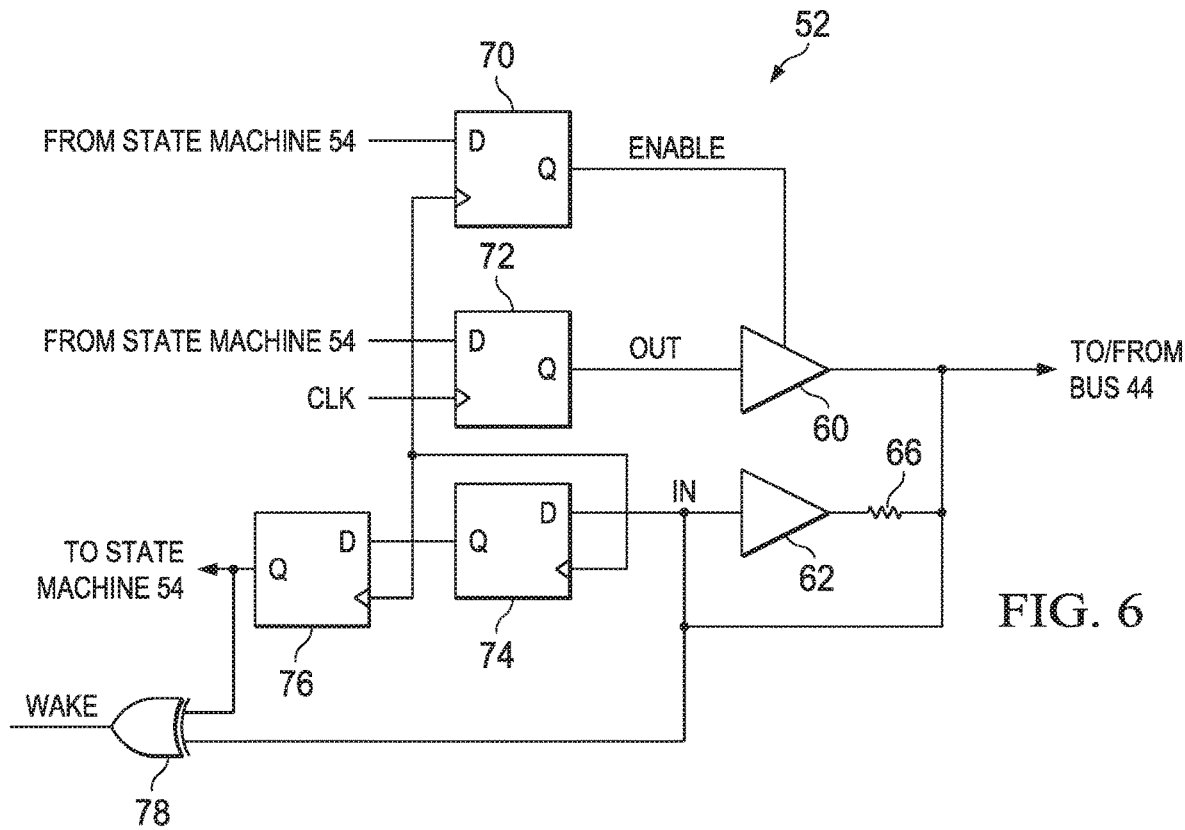
FIG. 6 illustrates a block diagram of selected components of a transceiver, in accordance with embodiments of the present disclosure.

Transceiver 52 may be coupled via pin 46 to shared communication bus 44. In operation, transceiver 52 may be configured to actively transmit data in accordance with a communication protocol on shared communication bus 44 and may also be configured to receive data via shared communication bus 44 from at least one of the other devices 42. An example implementation for transceiver 52 is depicted in FIG. 6, discussed in greater detail below.

State machine 54 may comprise any system, device, or apparatus configured to maintain respective state information of its device 42 and operate in accordance with such respective state information and data it receives from other devices via transceiver 52 and shared communication bus 44 in order to control signal processor 56 to generate an output signal at output 48. Signal processor 56 may comprise any system, device, or apparatus configured to, based on one or more control signals from state machine 54, perform processing on an input signal (e.g., application of gain, attenuation, filtering, etc.) to generate an output signal to output 48.

As shown in FIG. 5, state machine 54 may be synchronized to an internal synchronization clock CLK internal to device 42. In some embodiments, such synchronization clock CLK may comprise an oversampled synchronization clock with a known frequency tolerance. In each device 42, its respective state machine 54 may be synchronized to oversampled synchronization clock CLK in order to monitor a bus state of shared communication bus 44 and synchronize transmission of encoded symbols and encoded messages by such device to shared communication bus 44, as described in greater detail elsewhere in this disclosure.

In addition, based on its respective state information and/or events occurring local to such device 42, state machine 54 may transmit data via transceiver 50 and shared communication bus 44 to other devices 42. Such data may include, without limitation: (1) audio output path group delay matching information, (2) data and audio monitoring group delay matching information, (3) synchronized power up and power down information, (4) synchronized digital volume or gain change information, (5) respective state information, (6) information regarding a configuration change of the device 42 of the system including distributed network 40, (7) information regarding local error detection and/or a local response thereto, (8) device control and/or status information, (9) information relating to control and/or state of any signal processing, and (10) information regarding algorithmic parameters of the device 42. Thus, generally speaking, data communicated on shared communication bus 44 may comprise at least one of status information regarding distributed network 40, status information regarding the device 42 that transmitted the data, and a control parameter for controlling devices 42.

In addition, state machine 54 may be configured to maintain state of a device 42 such that it operates in accordance with the aforementioned communication protocol. An example of such communication protocol is described in greater detail below. In accordance with the multi-device synchronization approach described herein, all data communications on shared communication bus 44 are directly between devices 42 to be synchronized to one another, with all of the necessary logic and decision making to remain captive within such synchronized devices 42, meaning that the synchronization or data does not need to be routed back to a host processor for purposes of intervention or device management. Thus, such synchronization among devices 42 may occur at a fast rate and low response delay in order to minimize the effect of any undesirable acoustic behavior that can occur when sharing information between devices, such as error conditions. For example, an event may occur on one device 42 which requires notification to a host processor and a change in configuration to other devices 42 in distributed network 40. However, unlike existing approaches in which the host processor is required to distribute the information regarding the change in configuration to the other devices 42, the device 42 experiencing the event may communicate the relevant information across shared communication bus 44. The other devices 42 may receive such information and respond (e.g., alter their own internal state information and/or their respective output signals) based on the information communicated over shared communication bus 44 instead of requiring a host processor to reconfigure each device 42 individually. Once the condition causing the event on the first device 42 is no longer present, the other three devices 42 may again be notified via shared communication bus 44, and normal operation may resume.

FIG. 6 illustrates a block diagram of selected components of an example transceiver 52, in accordance with embodiments of the present disclosure. As shown in FIG. 6, transceiver 52 may include buffers 60 and 62, resistor 66, flip-flops 70, 72, 74, and 76, and logical XOR gate 78, all arranged as shown in FIG. 6. Although flip-flops 70, 72, 74, and 76 and XOR gate 78 are shown as integral to transceiver 52, in some embodiments, one or more of flip-flops 70, 72, 74, and 76 and XOR gate 78 may be integral to state machine 54. In addition, although flip-flops 70, 72, 74, and 76 are depicted as D flip-flops, any suitable flip-flops clocked on an edge transition of a clock signal (e.g., CLK) may be used in lieu of the depicted D flip-flops.

Buffer 60 may drive an output signal OUT to shared communication bus 44, and may be controlled by an enable signal for enabling buffer 60 for driving the output signal. As shown in FIG. 6, the enable signal ENABLE and the output signal OUT may be driven from respective flip-flops 70 and 72 clocked on an edge (e.g., a rising edge) of a clock signal CLK internal to device 42. In distributed network 40, each device 42 may maintain its own internal clock signal. Buffer 62 may drive an input signal IN internally to transceiver 52, and may also operate in connection with resistor 66 to form a weak keeper that maintains a voltage level (e.g., logic high or logic low) on shared communication bus 44 between transitions of the voltage level. For example, an effective driving of buffers 62 of all devices 42 coupled to shared communication bus 44 may be weaker than that of a buffer 60, such that a transition output by a buffer 60 will overcome the value maintained by the weak keepers formed in each device 42 by buffer 62 and resistor 66.

Flip-flops 74 and 76 may form a synchronizer clocked on an edge (e.g., rising edge) of internal clock signal CLK such that any toggle of a voltage level on shared communication bus 44 may not change the state of its output buffer 60 for at least two periods of the internal clock signal CLK.

XOR gate 78 may receive the output of flip flop 76 and the input signal IN as inputs and drive a wake signal WAKE. As mentioned above, internal clock signal CLK may be powered down to save power. Such wake signal WAKE may be used by state machine 54 to wake the internal clock signal CLK in response to an electrical transition of shared communication bus 44 after internal clock signal CLK has been powered down to save power.

In employing a distributed network 40 of devices 42 as described above, each device 42 may be able to encode data onto shared communication bus 44 (and also decode data on shared communication bus 44) in accordance with a non-return-to-zero pulse length modulation scheme in which information is transmitted by modulating the length between voltage level transitions of the voltage present on shared communication bus 44, with the weak keeper of the transceiver 52 of each device 42 maintaining the voltage level on shared communication bus 44 between voltage level transitions driven onto shared communication bus 44 by one or more devices 42. Such scheme may ensure that no electrical contention exists on shared communication bus 44 due to different-phased internal clock signals CLK of devices 42 and may allow a simple arbitration scheme, namely a wired logical OR wherein an encoded symbol (e.g., a logic "1") transmitted by a device 42 and represented by a shorter duration between transitions of the voltage level on shared communication bus 44 will take priority over an encoded symbol (e.g., a logic "0") transmitted by another device 42 and represented by a longer duration between transitions of the voltage level on shared communication bus 44.

Figure 7:
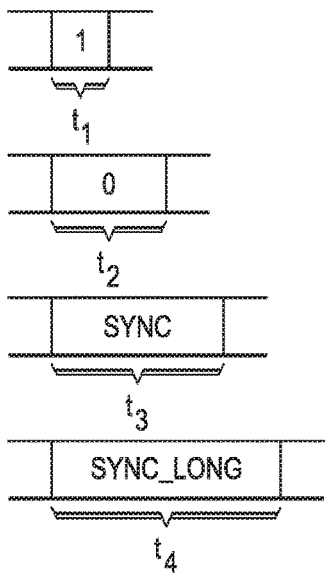
FIG. 7 illustrates a series of timing diagrams illustrating an encoding scheme of a communication protocol of a shared communication bus, in accordance with embodiments of the present disclosure.

FIG. 7 illustrates a series of timing diagrams illustrating an example encoding scheme of a communication protocol of shared communication bus 44, in accordance with embodiments of the present disclosure. In FIG. 7, the vertical line segments in each timing diagram represent a transition in the voltage level present on shared communication bus 44. Thus, FIG. 7 depicts a pulse-length encoding scheme for four symbols of logic 1, logic 0, a SYNC symbol, and a SYNC_LONG symbol. For example, to transmit a logic 1 to shared communication bus 44, a transmitting device 42 may attempt to drive shared communication bus 44 such that successive transitions of the voltage level of shared communication bus 44 occur at a duration $t_1$. As another example, to transmit a logic 0 to shared communication bus 44, a transmitting device 42 may attempt to drive shared communication bus 44 such that successive transitions of the voltage level of shared communication bus 44 occur at a duration $t_2$ which is substantially longer in time than duration $t_1$. Accordingly, by monitoring shared communication bus 44, and in particular, by monitoring the times between successive transitions of the voltage level on shared communication bus 44, a device 42 may determine symbols communicated by other devices 42 on shared communication bus 44. In addition, such encoding scheme, by its nature, is a priority encoding scheme in that if a first device 42 communicates a logic 1 symbol at the same time that a second device 42 attempts to communicate a logic 0 symbol, the first device 42 will take priority because the duration $t_1$ will expire before the duration $t_2$ such that that communication of the logic 1 symbol will be detected by devices 42 on shared communication bus 44 before communication of the logic 0 symbol is even attempted by second device 42.

Because of the pulse-length encoding scheme, additional symbols beyond logic 1 and logic 0 may be communicated. For example, a device 42 may transmit a symbol SYNC to shared communication bus 44 by driving shared communication bus 44 such that successive transitions of the voltage level of shared communication bus 44 occur at a duration $t_3$ which is substantially longer in time than duration $t_2$. As another example, a device 42 may transmit a symbol SYNC_LONG to shared communication bus 44 by driving shared communication bus 44 such that successive transitions of the voltage level of shared communication bus 44 occur at a duration $t_4$ which is substantially longer in time than duration $t_3$. One or both of such synchronization symbols SYNC and SYNC_LONG may be communicated by a device 42 in order to wake shared communication bus 44 from an idle state by transmitting an encoded synchronization symbol (e.g., SYNC or SYNC_LONG) on shared communication bus 44 such that other devices 42 on shared communication bus 44 synchronize their respective clocks CLK based on detection of the electrical transition of the voltage of shared communication bus 44 caused by transmission of the encoded synchronization symbol. For example, when a first device 42 desires to send a message on shared communication bus 44, it may communicate an encoded synchronization symbol (e.g., SYNC or SYNC_LONG) to shared communication bus 44 by transitioning the voltage level of shared communication bus 44 at the proper times. In response to receipt of the encoded synchronization symbol (and based on when transitions of the voltage level of shared communication bus 44 occur), each other device 42 may synchronize its own internal clock based on the timing of the encoded synchronization symbol and thus synchronize its transmission to and monitoring of shared communication bus 44 in synchronization with the first device 42. Accordingly, via communication of one or more encoded synchronization symbols, transmission and receipt of data via shared communication bus 44 may be independent of any synchronization clock external to devices 42, and may be dependent only upon synchronization clocks CLK internal to devices 42.

Figure 8:
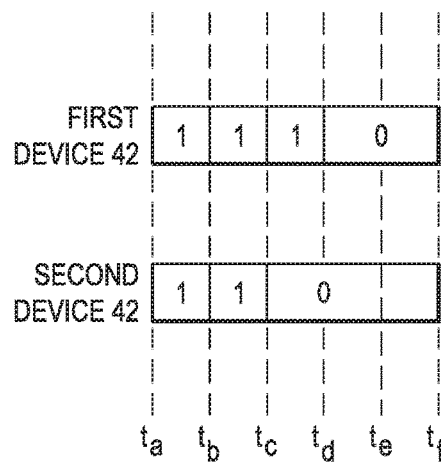
FIG. 8 illustrates a timing diagram illustrating an example hypothetical situation in which two devices attempt to communicate encoded messages at the same time, in accordance with embodiments of the present disclosure.

Furthermore, in accordance with the symbol-level encoding scheme described above, the communication protocol may also enable a message-level encoding scheme. For example, FIG. 8 illustrates a timing diagram illustrating an example hypothetical situation in which two devices 42 may attempt to communicate encoded messages at the same time, in accordance with embodiments of the present disclosure. In this hypothetical, a first device 42 may attempt to communicate a message encoded in binary as "1110" and a second device 42 may attempt to communicate a message encoded in binary as "1101." Due to the symbol-level encoding scheme described herein, both devices 42 will successfully communicate their respective first two symbols of their respective encoded messages to shared communication bus 44. In other words, both devices 42 will drive transitions of the voltage level on shared communication bus 44 at times $t_a$, $t_b$, and $t_c$ shown in FIG. 8. However, first device 42 will drive a transition at time $t_d$ to indicate the third symbol of its message is a logic 1, taking priority over second device 42 that would have otherwise driven a transition at time $t_e$ to indicate the third symbol of its message is a logic 0. Thus, because second device 42 may both transmit to and monitor shared communication bus 44, upon monitoring that a transition occurred on shared communication bus 44 prior to time $t_e$, state machine 54 of second device 42 may then cease attempting to communicate symbols of its respective message, as such monitoring would have indicated to state machine 54 of second device 42 that a message communicated by another device (e.g., first device 42) has priority over its own message. On the other hand, monitoring of shared communication bus 44 performed by state machine 54 of first device 42 will at time $t_d$ determine that a message from no other device 42 has yet taken priority over its own message, and will continue to communicate symbols associated with its message to shared communication bus 44, and will accordingly drive a transition at time $t_f$ to indicate that the fourth symbol of its message is a logic 0. Thus, encoded symbols and encoded messages transmitted on shared communication bus 44 are encoded in accordance with a most-significant bit priority encoding scheme.

Thus, in accordance with the communication protocol and the encoding scheme defined by such communication protocol, when one or more of devices 42 is actively transmitting data on shared communication bus 44, each device 42 (including transmitting devices 42) receives data via shared communication bus 44 such that bidirectional communication is established among devices 42 via shared communication bus 44. Further, in connection with receiving data via shared communication bus 44, each device 42 monitors a bus state of shared communication bus 44 to avoid data contention and to synchronize receipt of encoded symbols and encoded messages comprising such encoded symbols via shared communication bus 44. In addition, each actively transmitting device 42 may compare the bus state to a desired state of such actively transmitting device 42 to determine a priority among actively transmitting devices 42 with respect to shared communication bus 44.

In these and other embodiments of the present disclosure, in response to receipt of an encoded message via shared communication bus 44, each device 42 on shared communication bus 44 may transmit to the shared communication bus an encoded payload comprising a plurality of encoded symbols indicative of a variable associated with the encoded message. At least one device 42 may monitor shared communication bus 44 to determine a maximum value of the variable. In some embodiments, the at least one device 42 may determine the maximum value of the variable in accordance with a most-significant bit priority encoding scheme. For example, FIG. 9 illustrates a timing diagram illustrating an example hypothetical situation in which four devices 42 attempt to communicate encoded payloads in response to a message received via shared communication bus 44 by each of the devices 42, in accordance with embodiments of the present disclosure. As a specific example, a device 42 may communicate a message (e.g., a message having priority over other messages communicated on shared communication bus 44 as described above) for synchronizing a supply voltage provided to each of devices 42, wherein each device 42 may respond to the message with a payload encoding its own supply voltage, and at least one device 42 may determine the maximum value of the responses in accordance with a most-significant bit priority encoding scheme. If such supply voltages range from 0 V to 10V, a 9-bit encoding scheme could be used to represent such voltages, assuming that voltage granularity of 0.025 V is encoded (e.g., binary 0 0000 0000 represents 0 V, binary 1 1001 0000 represents 10 V). In the hypothetical of FIG. 9, first device 42 has a supply voltage of 9.75 V (1 1000 0110), second device 42 has supply voltage of 9.50 V (1 0111 1100), third device 42 has a supply voltage of 9.70 V (1 1000 0100), and fourth device 42 has a supply voltage of 9.00 V (1 0110 1000). As each device 42 transmits its response payload, state machine 54 of each device 42 may monitor its device's own state (e.g., the timing by which it should drive a transition on shared communication bus 44 in accordance with its payload) as well as monitor the state of shared communication bus 44, to determine if another device's payload has priority over it such that it should cease transmitting its payload. Thus, applying the most-significant bit priority encoding scheme, each device 42 may successfully drive transitions encoding their respective most-significant bits (logic 1). However, when attempting to drive their respective second most-significant bits (logic 0), state machines 54 of second device 42 and fourth device 42 may as a result of monitoring shared communication bus 44 determine that a transition encoding a logic 1 symbol driven by first device 42 and third device 42 was received before driving their own transitions to encode a logic 0 symbol, and thus may cease driving transitions in accordance with their own respective payloads. In addition, the payload of first device 42 will take priority over the payload of third device 42 on account that the eighth most-significant bit of the payload of first device 42 is a logic 1 symbol and the eighth most-significant bit of the payload of third device 42 is a logic 0 symbol (while the seven most-significant bits of each of first device 42 and third device 42 are the same).

In these and other embodiments, one or more encoded messages may each comprise a data structure comprising a plurality of encoded symbols to enable devices 42 to share bandwidth for transmitting encoded messages on shared communication bus 44. For example, such data structure may comprise a device priority field that establishes among devices 42, those devices 42 that have priority over other devices 42 for transmitting messages. In addition, state machines 54 of devices 42 may be configured such that when a device 42 is able to transmit a full message on shared communication bus 44, its device priority is decreased relative to one or more other devices 42 such that at a subsequent time, one of the other devices 42 takes priority over the device 42 that recently transmitted. For example, when a device 42 transmits a message, its respective state machine 54 may decrement its device priority value such that such device priority value is communicated within future message transmissions from such device 42. In addition or alternatively, when a device 42 attempts to transmits a message but another device 42 is able to transmit due to a higher priority, state machine 54 of the device 42 that unsuccessfully attempted to transmit a message may increment its device priority value such that such device priority value is communicated within future message transmissions from such device 42.

FIGS. 10A and 10B show example message formats employing device priority fields, in accordance with embodiments of the present disclosure. In FIG. 10A, a device priority field 82 may be appended after a message type field 80, such that, in accordance with the most-significant bit encoding scheme described above, the device priority field 82 may be used to give priority to one of a plurality of devices 42 attempting to transmit the same message type. In FIG. 10B, a device priority field 92 may be appended before a message type field 90, such that, in accordance with the most-significant bit encoding scheme described above, the device priority field 92 may be used to give priority to one of a plurality of devices 42 attempting to transmit to shared communication bus 44, regardless of message type.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A distributed network system, comprising:
 a shared communication bus that operates in accordance with a communication protocol; and
 a plurality of devices coupled to the shared communication bus;
 wherein, in accordance with the communication protocol:
  when two or more of the plurality of devices are simultaneously actively transmitting data on the shared communication bus, each of the plurality of devices receives data via the shared communication bus such that bidirectional communication is established among the plurality of devices via the shared communication bus;
  each of the plurality of devices monitors a bus state of the shared communication bus to avoid data contention and to synchronize receipt of encoded symbols and encoded messages comprising encoded symbols via the shared communication bus; and
  each actively transmitting device of the plurality of devices compares the bus state to a desired state of such actively transmitting device to determine a priority among actively transmitting devices of the plurality of devices with respect to the shared communication bus.

2. The distributed network system of claim 1, wherein the shared communication bus comprises a single electrical node.

3. The distributed network system of claim 1, wherein transmission and receipt of data via the shared communication bus is independent of any synchronization signal external to the plurality of devices.

4. The distributed network system of claim 1, wherein each of the plurality of devices comprises:
 an oversampled synchronization clock with a known frequency tolerance; and
 a state machine synchronized to the oversampled synchronization clock in order to monitor the bus state and synchronize transmission of encoded symbols and encoded messages by such device to the shared communication bus.

5. The distributed network system of claim 4, wherein each of the plurality of devices is configured to:
 disable its oversampled synchronization clock to conserve electrical energy; and
 wake its oversampled synchronization clock in response to an electrical transition on the shared communication bus.

6. The distributed network system of claim 1, wherein encoded symbols and encoded messages transmitted on the shared communication bus are encoded in accordance with a most-significant bit priority encoding scheme.

7. The distributed network system of claim 1, wherein encoded symbols are encoded based on a duration of time between electrical transitions of a voltage of the shared communication bus.

8. The distributed network system of claim 1, wherein in response to receipt of an encoded message via the shared communication bus:
 each of the plurality of devices simultaneously transmits to the shared communication bus an encoded payload comprising a plurality of encoded symbols indicative of a variable associated with the encoded message; and
 at least one device of the plurality of devices monitors the shared communication bus to determine a maximum value of the variable.

9. The distributed network system of claim 8, wherein the at least one device determines the maximum value of the variable in accordance with a most-significant bit priority encoding scheme.

10. The distributed network system of claim 1, wherein an encoded message comprises a data structure comprising a plurality of encoded symbols to enable the plurality of devices to share bandwidth for transmitting encoded messages on the shared communication bus.

11. The distributed network system of claim 1, wherein each of the devices is configured to wake the shared communication bus from an idle state by causing an electrical transition of a voltage of the shared communication bus.

12. The distributed network system of claim 1, wherein each of the devices is configured to wake the shared communication bus from an idle state by transmitting an encoded synchronization symbol on the shared communication bus such that other devices on the shared communication bus synchronize respective synchronization clocks internal to the other devices based on detection of an electrical transition of a voltage of the shared communication bus associated with the encoded synchronization symbol.

13. A distributed network system, comprising:
a shared communication bus that operates in accordance with a communication protocol; and
a plurality of devices coupled to the shared communication bus;
wherein, in accordance with the communication protocol, in response to receipt of an encoded message via the shared communication bus:
each of the plurality of devices simultaneously transmits to the shared communication bus an encoded payload comprising a plurality of encoded symbols indicative of a variable associated with the encoded message; and
at least one device of the plurality of devices monitors the shared communication bus to determine a maximum value of the variable.

14. The distributed network system of claim 13, wherein the at least one device determines the maximum value of the variable in accordance with a most-significant bit priority encoding scheme.

15. A distributed network system, comprising:
a shared communication bus that operates in accordance with a communication protocol; and
a plurality of devices coupled to the shared communication bus;
wherein, in accordance with the communication protocol, encoded messages transmitted by the plurality of devices to the shared communication bus each comprises a data structure comprising a plurality of encoded symbols, wherein the encoded symbols enable the plurality of devices to share bandwidth for transmitting encoded messages on the shared communication bus.

16. A distributed network system, comprising:
a shared communication bus that operates in accordance with a communication protocol; and
a plurality of devices coupled to the shared communication bus;
wherein each of the devices is configured to wake the shared communication bus from an idle state by transmitting an encoded synchronization symbol on the shared communication bus such that other devices on the shared communication bus synchronize respective synchronization clocks internal to the other devices based on detection of an electrical transition of the encoded synchronization symbol on the shared communication bus.

17. A method comprising:
operating a plurality of devices of a distributed network system in accordance with a communication protocol for a shared communication bus to which the plurality of devices are each coupled such that in accordance with the communication protocol:
when two or more of the plurality of devices are simultaneously actively transmitting data on the shared communication bus, each of the plurality of devices receives data via the shared communication bus such that bidirectional communication is established among the plurality of devices via the shared communication bus;
each of the plurality of devices monitors a bus state of the shared communication bus to avoid data contention and to synchronize receipt of encoded symbols and encoded messages comprising encoded symbols via the shared communication bus; and
each actively transmitting device of the plurality of devices compares the bus state to a desired state of such actively transmitting device to determine a priority among actively transmitting devices of the plurality of devices with respect to the shared communication bus.

18. The method of claim 17, wherein the shared communication bus comprises a single electrical node.

19. The method of claim 17, further comprising operating the plurality of devices such that transmission and receipt of data via the shared communication bus is independent of any synchronization signal external to the plurality of devices.

20. The method of claim 17, further comprising operating the plurality of devices in order to synchronize a state machine of each respective device of the plurality of devices to an oversampled synchronization clock of the respective device with a known frequency tolerance in order to monitor the bus state and synchronize transmission of encoded symbols and encoded messages by such device to the shared communication bus.

21. The method of claim 20, further comprising operating the plurality of devices such that each of the plurality of devices is configured to:
disable its oversampled synchronization clock to conserve electrical energy; and
wake its oversampled synchronization clock in response to an electrical transition on the shared communication bus.

22. The method of claim 17, further comprising encoding encoded symbols and encoded messages transmitted on the shared communication bus in accordance with a most-significant bit priority encoding scheme.

23. The method of claim 17, further comprising encoding encoded symbols based on a duration of time between electrical transitions of a voltage of the shared communication bus.

24. The method of claim 17, further comprising operating the plurality of devices such that in response to receipt of an encoded message via the shared communication bus:
each of the plurality of devices simultaneously transmits to the shared communication bus an encoded payload comprising a plurality of encoded symbols indicative of a variable associated with the encoded message; and
at least one device of the plurality of devices monitors the shared communication bus to determine a maximum value of the variable.

25. The method of claim 24, further comprising operating the plurality of devices such that the at least one device determines the maximum value of the variable in accordance with a most-significant bit priority encoding scheme.

26. The method of claim 17, wherein an encoded message comprises a data structure comprising a plurality of encoded symbols to enable the plurality of devices to share bandwidth for transmitting encoded messages on the shared communication bus.

27. The method of claim 17, further comprising operating the plurality of devices such that each of the devices is configured to wake the shared communication bus from an idle state by causing an electrical transition of a voltage of the shared communication bus.

28. The method of claim 17, further comprising operating the plurality of devices such that each of the devices is configured to wake the shared communication bus from an idle state by transmitting an encoded synchronization symbol on the shared communication bus such that other devices on the shared communication bus synchronize respective synchronization clocks internal to the other devices based on detection of an electrical transition of a voltage of the shared communication bus associated with the encoded synchronization symbol.

29. A method, comprising:
operating a plurality of devices of a distributed network system in accordance with a communication protocol for a shared communication bus to which the plurality of devices are each coupled such that in accordance with the communication protocol, in response to receipt of an encoded message via the shared communication bus:
   each of the plurality of devices simultaneously transmits to the shared communication bus an encoded payload comprising a plurality of encoded symbols indicative of a variable associated with the encoded message; and
   at least one device of the plurality of devices monitors the shared communication bus to determine a maximum value of the variable.

30. The method of claim 29, further comprising operating the plurality of devices such that the at least one device determines the maximum value of the variable in accordance with a most-significant bit priority encoding scheme.

31. A method, comprising:
operating a plurality of devices of a distributed network system in accordance with a communication protocol for a shared communication bus to which the plurality of devices are each coupled such that in accordance with the communication protocol, encoded messages transmitted by the plurality of devices to the shared communication bus each comprises a data structure comprising a plurality of encoded symbols, wherein the encoded symbols enable the plurality of devices to share bandwidth for transmitting encoded messages on the shared communication bus.

32. A method, comprising:
operating a plurality of devices of a distributed network system in accordance with a communication protocol for a shared communication bus to which the plurality of devices are each coupled such that in accordance with the communication protocol, each of the devices is configured to wake the shared communication bus from an idle state by transmitting an encoded synchronization symbol on the shared communication bus such that other devices on the shared communication bus synchronize respective synchronization clocks internal to the other devices based on detection of an electrical transition of the encoded synchronization symbol on the shared communication bus.

* * * * *